United States Patent [19]

Fukuhara

[11] Patent Number: 4,867,664
[45] Date of Patent: Sep. 19, 1989

[54] EXTRUSION MOLDING EQUIPMENT FOR MULTI-LAYER PARISON

[75] Inventor: Keiji Fukuhara, Hiroshima, Japan
[73] Assignee: Mazda Motor Corporation, Hiroshima, Japan
[21] Appl. No.: 182,595
[22] Filed: Apr. 18, 1988

[30] Foreign Application Priority Data

Apr. 17, 1987 [JP] Japan .................. 62-94924

[51] Int. Cl.⁴ .............. B29C 47/08; B29C 47/36; B29C 47/92
[52] U.S. Cl. ................. 425/132; 264/40.5; 264/40.7; 264/515; 425/133.1; 425/145; 425/147; 425/166; 425/381; 425/523; 425/532
[58] Field of Search .............. 425/141, 145, 146, 149, 425/131.1, 133.1, 381, 132, 523, 147, 166, 532, 140, 171; 264/40.7, 40.5, 40.3, 40.1, 515

[56] References Cited

U.S. PATENT DOCUMENTS

| | | | |
|---|---|---|---|
| 3,357,049 | 12/1967 | Spindler | 425/146 |
| 3,712,772 | 1/1973 | Hunkar | 425/141 |
| 3,746,486 | 7/1973 | Koster | 425/146 |
| 3,820,928 | 6/1974 | Lemelson | 425/146 |
| 3,870,445 | 3/1975 | Hold et al. | 425/149 |
| 4,011,493 | 3/1977 | Fukase et al. | 425/381 |
| 4,056,344 | 11/1977 | Lemelson | 425/133.1 |
| 4,120,633 | 10/1978 | Feuerherm | 425/462 |
| 4,149,839 | 4/1979 | Iwawaki et al. | 425/532 |
| 4,179,251 | 12/1979 | Hess et al. | 425/140 |
| 4,185,954 | 1/1980 | Murakami et al. | 425/462 |
| 4,297,092 | 10/1981 | Goron | 425/133.1 |
| 4,302,170 | 11/1981 | Goron | 425/133.1 |
| 4,338,071 | 7/1982 | Daubenbuchel et al. | 425/145 |
| 4,422,838 | 12/1983 | Iwawaki et al. | 425/376 A |
| 4,424,178 | 1/1984 | Daubenbuchel et al. | 264/40.1 |
| 4,472,192 | 9/1984 | Siard | 425/381 |
| 4,512,943 | 4/1985 | Hahn et al. | 264/173 |
| 4,522,775 | 6/1985 | Briggs et al. | 264/173 |
| 4,565,515 | 1/1986 | Maier | 425/381 |
| 4,578,025 | 3/1986 | Ando et al. | 425/133.1 |
| 4,717,326 | 1/1988 | Montonaga et al. | 425/133.1 |

FOREIGN PATENT DOCUMENTS

52-37026 9/1977 Japan.
58-23212 5/1983 Japan.

Primary Examiner—Jan H. Silbaugh
Assistant Examiner—Mathieu Vargot
Attorney, Agent, or Firm—Fleit, Jacobson, Cohn, Price, Holman & Stern

[57] ABSTRACT

An extrusion molding equipment for a multi-layer parison which includes an operation position detecting device for detecting an operation position of an accumulator extruding an layer of resin material invisible from outside the parison. A pressure detecting device is provided for detecting pressure of the inner resin material in an inner resin conduit. An extrusion amount control device for the inner resin material is also provided for controlling an extrusion amount of the inner resin by the use of a signal indicating the operation position from the operation position detecting device, and a signal indicating the pressure from the pressure detecting device.

16 Claims, 5 Drawing Sheets

EXTRUSION MOLDING EQUIPMENT FOR MULTI-LAYER PARISON

BACKGROUND OF THE INVENTION

1. Field of the Invention

The present invention generally relates to an extrusion molding equipment, and more particularly, to an extrusion molding equipment for making a multi-layer parison having a plurality of resin layers laminated therein.

2. Description of Prior Art

Conventionally, a hollow article of a resin material is generally formed through a blow molding process in which a pressurized gas is blown into a parison inserted into a set of molds. Sometimes a multi-layer parison having a plurality of resin layers laminated therein has been employed in the blow molding process when the properties for a molded product of a single resin material are insufficient for the intended use. In case of a fuel tank made of a resin material, such as high-density polyethylene, for example, the problem of gasoline permeation exists and the gasoline stored within the tank may permeate through the tank wall.

Japanese Patent Publication (Tokkosho) No. 58-23212 discloses a hollow article having a plurality of resin layers laminated therein. The article is formed from a multi-layer parison using known blow molding techniques as a way to deal with this permeation problem. More specifically, an extrusion molding process is used to produce the multi-layer parison. The multi-layer parison has an inner barrier resin layer of a nylon resin material for preventing the gasoline from permeating therethrough, an outer resin layer of high-density polyethylene, and an adhesive resin layer of a modified polyethylene. The adhesive resin layer is formed between the inner barrier resin layer and the outer resin layer and securely bonds the inner barrier resin layer to the outer resin layer. Accordingly, the hollow article is formed from the parison by the use of a known blow molding technique.

In conventional extrusion molding equipment as described above, each of the resin materials forming the three resin layers is stored in its own respective resin storing space. The multi-layer parison is formed by extruding the three resin materials simultaneously from a nozzle. However, when the aforementioned multi-layer parison is formed by conventional or known extrusion molding equipment, at least one resin material is extruded beyond the desired limits for that material. Therefore, the layer of resin material will extend beyond the desired limits. Also, difficulty is experienced in controlling the thickness of the layer as well as its cut off.

Accordingly, it is most important for each resin layer to be formed to the proper predetermined thickness and this requires appropriate control of the extrusion pressures of the resin materials, especially at the junction where the resin materials meet during the extrusion. This is generally accomplished in conventional extrusion molding equipment as described above by controlling each accumulator and extrusion piston and cylinders associated therewith by a time constant generation type control apparatus comprising relief valves, a proportional electromagnetic pressure control valve, a time constant generation type power amplifier and digital type predetermining equipment. Control of such a apparatus is intended to control properly the pressure at the junction of the resin materials. The extrusion operation of extruders and plungers is controlled by limit switches associated with the rods converted to the plungers in the extrusion cylinders. Also, starting times of extrusion of the resin materials are controlled by timers associated with the extrusion cylinders. In this manner delay times are set between the starting time of one resin material extrusion and the starting times of the other resin materials extrusion.

However, in the control system of the resin material pressure as described above, if resin is leaking from the nozzle, the resin material extrusion amount from the extrusion cylinder is more than desired. Therefore, it is difficult to control properly the resin material amount with the control system as noted. One may consider controlling the resin material extrusion amount by monitoring the resin pressure by the use of a pressure detecting device set to sense the resin material in the conduit of the extruder. However, the pressure in the conduit is changed according to the change of the resin material viscosity due to its temperature. Also, if the conduit becomes narrow by piling the resin material, the pressure in the conduit is changed to an abnormal value. Accordingly, proper control of the resin material amount by the control system described is difficult. These problems are particularly notable with respect to the extrusion of the inner layers of the barrier resin and the adhesive resin which are invisible from outside the parison.

SUMMARY OF THE INVENTION

Accordingly, the present invention has been developed with a view to substantially eliminating the above-described disadvantages inherent in the prior art extrusion molding equipment, and has for its essential object to provide an improved extrusion molding equipment which is capable of extrusion molding a multi-layer parison having at least the inner resin layers which are invisible from outside the parison of predetermined thicknesses; even if the resin material leaks from the nozzle, the resin material conduit becomes narrow by piling the resin material, and the temperature of the resin material is changed.

In accomplishing the aforementioned object, the present invention provides an extrusion molding equipment for a multi-layer parison which includes an operation position detecting device for detecting an operation position of an accumulator extruding the inner resin material invisible from outside the parison, a pressure detecting device for detecting pressure of the inner resin material fed into the inner resin conduit and an extrusion amount control device for the inner resin material for controlling the extrusion amount of the inner resin by the use of a signal indicating the operation position and a signal indicating the pressure.

Accordingly, in case the inner resin material leaks out of the nozzle, the inner resin material conduit becomes narrow and the temperature of the inner resin material is changed. As a result, the inner resin material is stably extruded a predetermined amount by the operation of the accumulator. Therefore, at least the inner resin layer of the multi-layer parison is securely formed to the preselected, desired, predetermined thickness.

BRIEF DESCRIPTION OF THE DRAWINGS

The objects and features of the present invention will become apparent from the following description taken in conjunction with the preferred embodiment thereof with reference to the accompanying drawings, in which like parts are designated by the reference numerals, and in which.

DETAILED DESCRIPTION OF THE PREFERRED EMBODIMENT

Figure 1:
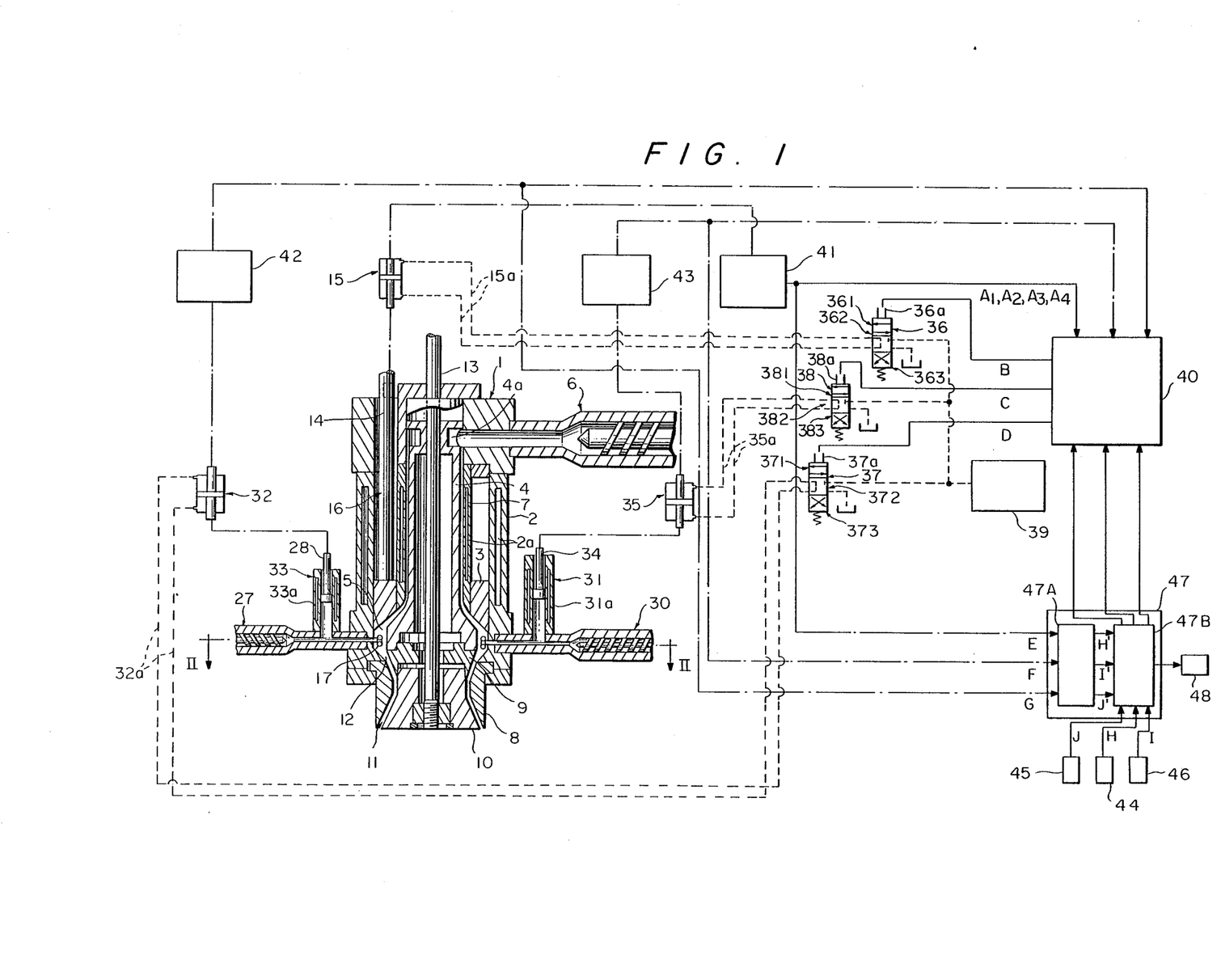
FIG. 1 is a vertical sectional view of the novel extrusion molding equipment.

Referring now to the drawings, FIG. 1 illustrates the construction of an extrusion molding equipment for a multi-layer parison according to one preferred embodiment of the present invention.

The extrusion molding equipment consists of an accumulator head 1 with a cylindrical shell or member 2 forming the lower half of the accumulator head 1. A ringed or annular piston 3 reciprocates up and down along the inner peripheral surface of the cylindrical member 2. A first annulus or core 4 is fixedly mounted on the cylindrical member 2 at the central part of the accumulator head 1 and penetrates the ringed piston 3.

A resin storing space 5 is internally defined between shell 2 and core 4 to accommodate the ringed piston 3 as it reciprocates. A chief resin material, for example, high-density polyethylene resin, sequentially extruded from a first extruder in a melted state is supplied into the resin storing space 5 by way of an annular passage 7 defined in annulus 4 that communicates with the first extruder 6 via a groove 4a.

The chief resin material stored in the resin storing space 5 is controlled in temperature by a first temperature control device 2a consisting of a plurality of rod heaters or the like embedded in member 2 spaced at predetermined intervals around the periphery of the cylindrical member 2.

An annular die 8 is coaxially mounted at the lower end of cylindrical member 2, and is fixed thereon. A second core 10', also coaxially disposed with respect to the die 8, is slidingly engaged with an annular core support 9 at the control portion thereof so as to be reciprocal in a vertical or axial direction thereof. The core support 9 is securely mounted on the lower end of the first core 4.

Both the die 8 and the second core 10 are conically formed at the inner peripheral surface of the lower end portion of the former and at the outer peripheral surface of the lower end portion of the latter, to form an annular die slit 11 therebetween. The die slit 11 communicates with the aforementioned resin storing space 5 through an annular resin passage 12 defined by the cylindrical member 2, the die 8, the first core 4 and the core support 9.

The second core 10 is reciprocally movable in a vertical direction by a hydraulic cylindrical member (not shown) through a rod 13 in order that the die slit 11 defined between the die 8 and the second core 10 can be controlled in its width, e.g., in its thickness in a radial direction thereof. The ringed piston 3 is downwardly moved by a first extrusion cylindrical member 15 comprising a single-acting hydraulic cylindrical member through a first plunger 14.

The chief resin material stored within the resin storing space 5 is forcibly fed to the die slit 11 by way of the resin passage 12 from a first accumulator 16 composed of resin space 5 by means of first extrusion cylindrical member 15 and the ringed piston 3.

Figure 2:
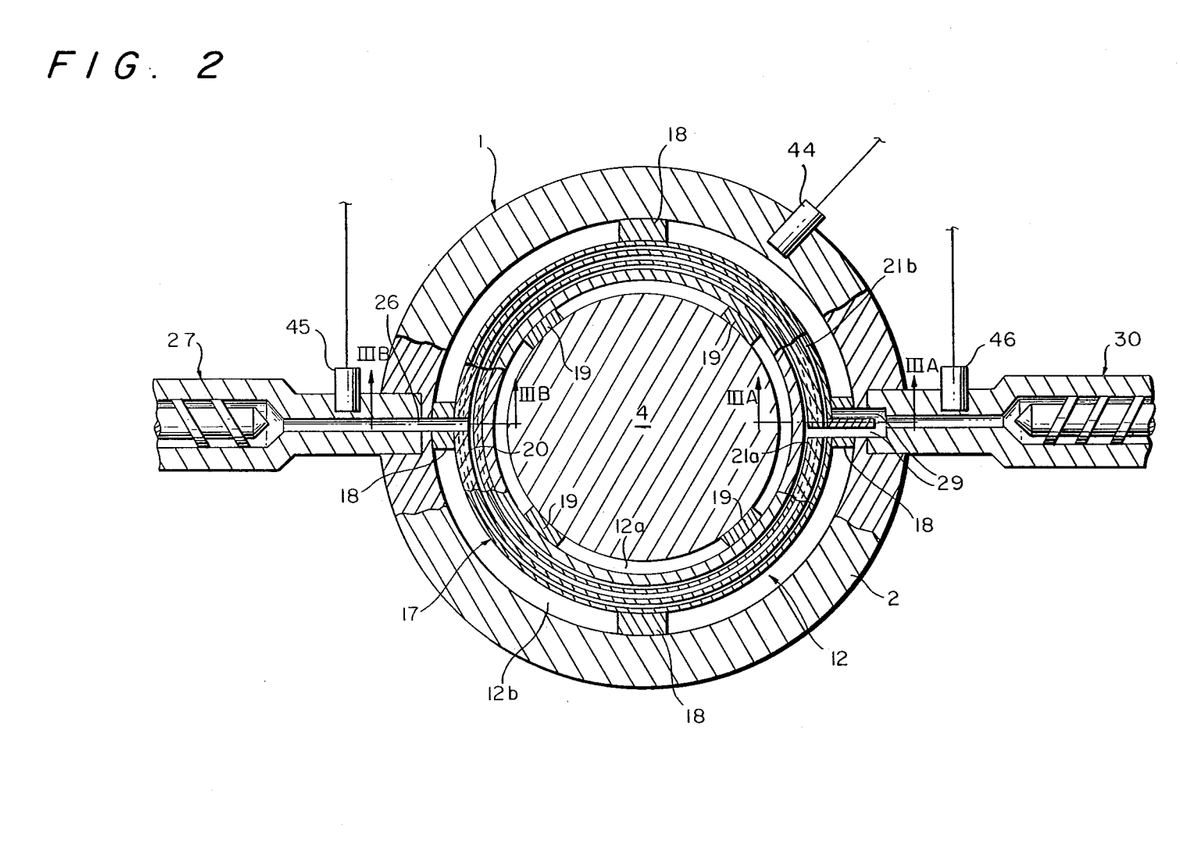
FIG. 2 is a cross-sectional taken along line II—II of FIG. 1.
Figure 3A:
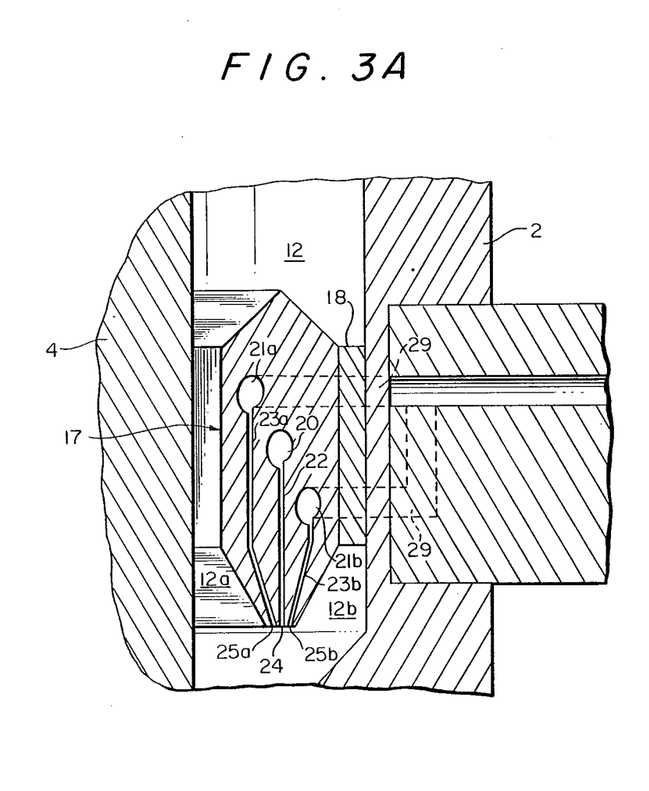
FIG. 3A is a cross-sectional taken along line IIIA—IIIA of FIG. 2.
Figure 3B:
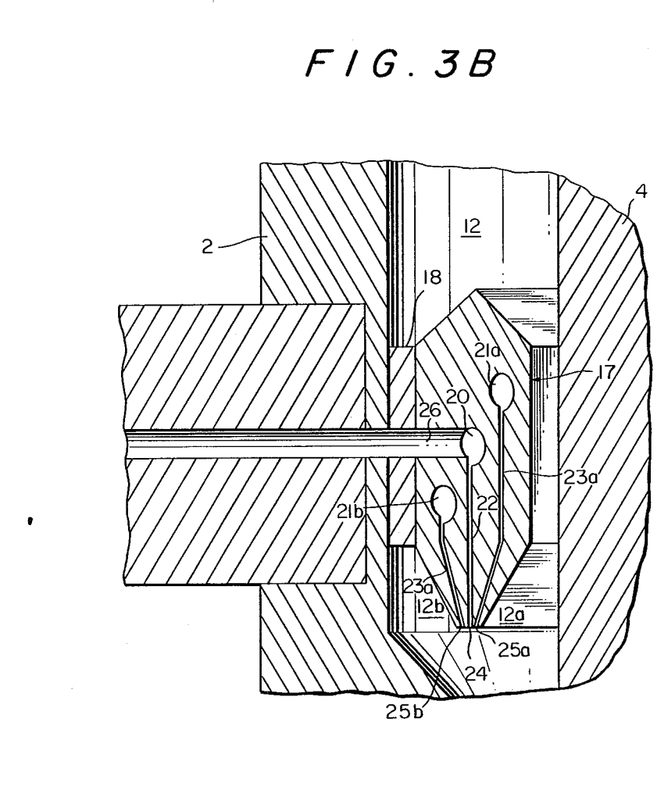
FIG. 3B is a cross-sectional view taken along line IIIB—IIIB of FIG. 2.

As shown in FIGS. 2, 3A and 3B, a ringed member 17 having a cross-section approximately similar to that of an elongated hexagon is coaxially disposed in the resin passage 12.

The ringed member 17 is securely supported from the inner peripheral surface of the cylindrical member 2 through four pieces or blocks 18 defining first support members spaced peripherally at regular intervals. Member 17 is supported from the outer peripheral surface of the first core 4 through four pieces or blocks 19 defining second support members also spaced peripherally at regular intervals but at interleaved positions relative to first support members 18. The resin passage 12 is divided by the ringed member 17 into two flow paths, an inside annular resin passage 12a and an outside annular resin passage 12b. The ringed member 17 is internally provided with an annular resin conduit 20 from the barrier resin, which conduit 20 is formed substantially at the central portion thereof. Two annular resin conduits 21a and 21b for adhesive resin are formed on respective sides of the barrier resin conduit 20 and are located slightly inner and outer radially with respect to the conduit 20 with one more located upstream and one more located downstream. The resin conduits 20, 21a and 21b communicate with three coaxially defined annular injection openings which are nozzles 24, 25a and 25b formed at the lower end of the ringed member 17, respectively, by way of annular slits 22, 23a and 23b.

The barrier resin conduit 20 communicates with second extruder 27, disposed outside the accumulator head 1, by way of a barrier resin conduit 26 defined in one of the first support members 18 arranged between the ringed member 17 and the cylindrical member 2. A second accumulator 33 is arranged at the forward end of the second extruder 27 for temporarily storing therein the barrier resin in the melted state sequentially extruded from the second extruder 27 and for injecting the resin by operating a second plunger 28 which is operated downwardly by a second extrusion cylindrical member 32 comprising a single-acting hydraulic cylindrical member. The second accumulator 33 is provided with a second temperature control device 33a which encloses the outer peripheral surface of the second accumulator 33 and is in the form of a conventional cylindrical heater or the like for controlling the resin stored therein in temperature.

Both of the adhesive resin conduits 21a and 21b communicate with a third extruder 30, disposed outside the accumulator head 1, by way of adhesive resin conduit 29 defined in another one of the first support members 18 arranged between the ringed member 17 and the cylindrical member 2. A third accumulator 31 is also arranged at the front end of the third extruder 30 for temporarily storing therein the adhesive resin, for example, modified polyethylene resin, sequentially extruded from the third extruder 30 and for injecting the resin by operating downwardly a third cylinder 34. In the same manner as the second temperature control device 33a, a third temperature control device 31a is so disposed on the third accumulator 31 as to enclose the outer peripheral surface thereof in the form of a cylindrical heater or the like for controlling the resin stored therein in temperature.

The first extrusion cylindrical member 15 operating the first accumulator is connected via lines 15a with a conventional hydraulic supply and control apparatus 39 by way of a first pressure servo valve 36 comprising an electromagnetic proportional expression valve.

In the same manner as the first extrusion cylindrical member 15, second extrusion cylindrical member 32 operating second accumulator 33 is connected via lines 32a with the hydraulic supply and control apparatus 39, by way of a second pressure servo valve 37. Also third extrusion cylindrical member 35 of third accumulator 31 is connected via lines 35a with the hydraulic supply and control apparatus 39, by way of a third pressure servo valve 38.

Each of first, second and third solenoids 36a, 37a and 38a of respective first, second and third pressure servo valve 36, 37 and 38 is controlled by a magnetizing signal from a parison control circuit 40.

The first pressure servo valve 36 defines the pathways 361, 362 and 363, e.g., valve 36 is a three position spool valve. In the same manner, the second pressure servo valve 37 defines three pathways 371, 372 and 373, and the third pressure servo valve 38 defines three pathways 381, 382 and 383. The selection of the pathway of the respective first, second and third pressure servo valves 36, 37 and 38 to connect the respective extrusion cylindrical members 15, 32 and 35 with the hydraulic supply and control apparatus 39 is determined by the magnetizing signal which originates from control circuit 40.

The first extrusion cylindrical member 15 is connected with a conventional first plunger position detecting device 41 for detecting the position of the first plunger 14. The first plunger position detecting device 41 provides a signal of the operation position of the first plunger 14 to the parison control circuit 40.

In the same manner as the first extrusion cylindrical member 15, the second extrusion cylindrical member 32 is connected with a second plunger position device 42 for detecting the operation position of the second plunger 28, and the third extrusion cylindrical member 35 is connected with a third plunger position 43 for detecting the operation position of the third plunger 34. The second plunger position detecting device 42 provides a signal of the position of the second plunger 28 to the parison control circuit 40, and the third plunger portion detecting device 43 provides a signal of the position of the third plunger 34 to the parison control circuit 40. Accordingly, accumulator operation position detecting means for detecting the operating position of the second accumulator 33 and the operating position of the third accumulator 31 is comprised of the second plunger position detecting device 42 and the third plunger position detecting device 43.

A first conventional pressure detecting device 44 for detecting the pressure of the chief resin material in the resin passage 12 is disposed in the resin passage 12 connected with the first extruder 6. In the same manner as the first pressure detecting device 44, a second pressure detecting device 45, for detecting the pressure of the barrier resin in the resin conduit 26, is disposed in the resin conduit 26 of the second extruder 27, and a third pressure detecting device 46 for detecting the pressure of the adhesive resin in adhesive resin conduit 29 is disposed in the resin conduit 29 leading from the third extruder 30. Each of the first, second and third plunger position detecting devices 41, 42 and 43 provides respective operation position detecting signals to a resin extrusion amount correction circuit 47, and each of the first, second and third pressure detecting devices 44, 45 and 46 provides respective pressure detecting signal to the resin extrusion amount correction circuit 47.

A regular values memory circuit 47A receives the first, second and third operation position signals E, G and F from the respective first, second and third plunger position detecting devices 41, 42 and 43. The regular values memory circuit 47A is a look up table in which regular values of mutual relation between respective operation positions of the first, second and third plungers 14, 28 and 34 and respective resin material pressures provided by signals H, J and I from the respective resin material pressure devices 44, 45 and 46 are compared and checked against the look up table. Specifically, the regular values memory circuit 47A memorizes data of the regular values corresponding to an operation as shown by the curves of FIG. 6.

A comparator 47B receives the first, second and third pressure signals H, J and I from the respective first, second and third pressure detecting devices 44, 45 and 46 and compares them with regular signals H', J' and I' of the respective resin material pressures from the regular values memory circuit 47A. Therefore, the comparator 47B compares the values corresponding to the first, second and third pressure signals H, J and I with the regular values corresponding to the signals H', J' and I' and calculates correction signals according to the difference between the values corresponding to the first, second and third pressure signals H, J and I and the regular values corresponding to the signals H', J' and I'. If the values corresponding to the signals H, J and I are within the limits of the regular values corresponding to the signals H', J' and I', the comparator 47B does not calculate the correction signals and does not provide the correction signals to the parison control circuit 40.

If the values corresponding to the signals H, J and I are beyond the limits of the regular values corresponding to the signals H', J' and I', the comparator 47B calculates the correction signals by the differences between the values corresponding to the first, second and third pressure detecting signals H, J and I and the regular values of the respective resin material pressures and provides the correction signals to the parison control circuit 40. If the comparator 47B regards the parison extrusion molding equipment as wrong, the comparator 47B send a warning signal to a warning device 48 to warn the operator of the possible malfunction.

Figure 4:
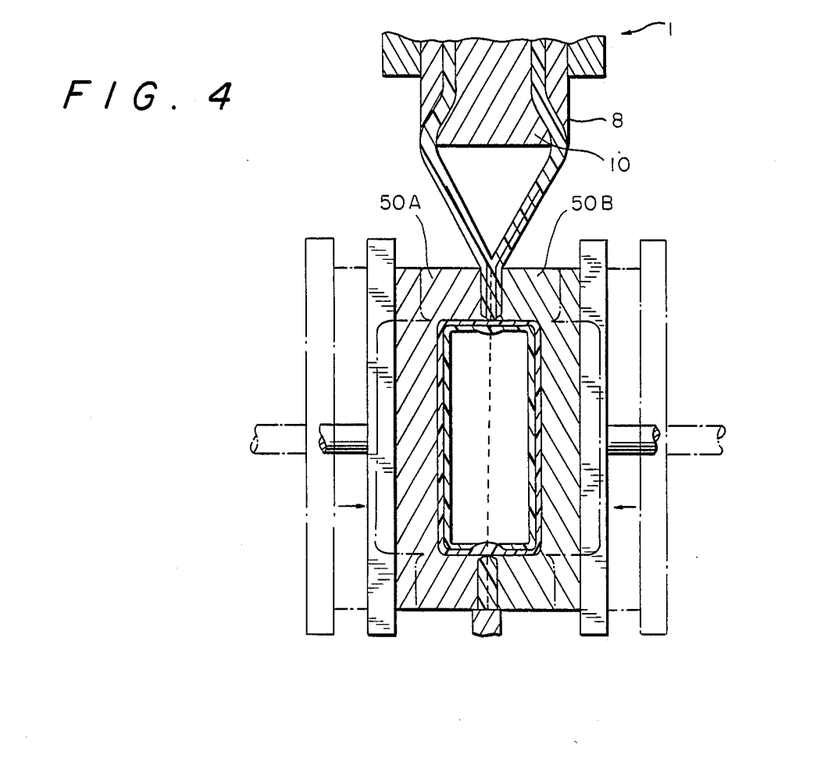
FIG. 4 is a vertical sectional view of blow molding equipment showing the general construction thereof.
Figure 6:
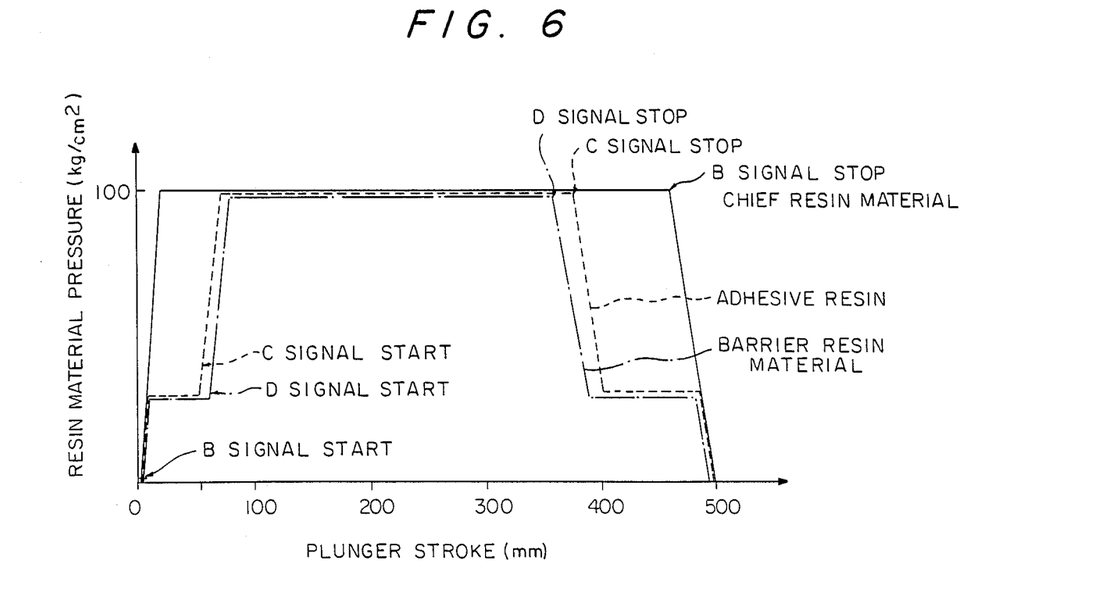
FIG. 6 is a timing chart indicating extrusion pressures of resin materials for extruding a multi-layer parison.

Points B, C and D of the curves shown in FIG. 6 indicate respective resin material extrusion starting and stopping points. Before the starting points B, C and D and after the stopping points B, C and D, the adhesive resin material and the barrier resin material are pressurized by the effect of the chief resin material being given pressure. Point B starts at zero pressure and zero stroke. Point B stops at 100 kg per cm$^2$ and about 460 mm stroke. Point C starts at about 25 kg per cm$^2$ and about 45 mm stroke and stops at about 100 kg per cm$^2$ and about 380 mm stroke. Point D starts at about 25 kg per cm$^2$ and about 55 mm stroke and stops at about 100 kg per cm$^2$ and about 350 mm stroke. Accordingly, a subresin material extrusion amount control device controlling the subresin material extrusion amounts based on the signals G and F and the signals J and I comprises the correction circuit 47 and the parison control circuit 40. The parison extruded by the aforementioned equipment is shown in FIG. 4 and is molded as a hollow article having a cavity formed of molds 50A and 50B by a pressurized gas being blown into the parison inserted into the molds 50A and 50B. The molding is conventional. Before starting the extrusion molding operation, the parison control circuit 40 does not provide any magnetizing signal to the first, second and third pressure servo valves 36, 37 and 38. So the first, second and third solenoids 36A, 37a and 38a of the first, second and third pressure servo valves 36, 37 and 38 are demagnetized. The first plunger 14 is connected with the first pressure servo valve 36, by way of the first extrusion cylindrical member 15, so the first plunger 14 is caused to be freely movable. For the same reason, each of the second and third plungers 28 and 34 is connected with respective second and third pressure servo valves 37 and 38, by way of respective second and third extrusion cylindrical members 32 and 35, so the second and third plunger 28 and 34 are caused to be freely movable.

Accordingly, in the accumulator head 1, the chief resin material led into the resin storing space 5 by being extruded from the first extruder 6 is stored within the resin storing space 5, while raising the ringed piston 3. In the same manner, the barrier resin and the adhesive resin of auxiliary resin materials, respectively, extruded from the second and third extruders 27 and 30, are stored in the second and third accumulators 33 and 31, while raising the second plunger 28 and the third plunger 34 disposed in respective accumulators 33 and 31.

Thereafter, when a predetermined of the chief resin material is stored in the resin storing space 5, a piston rod of the first extrusion cylindrical member 15 rises to a predetermined top end position. Therefore, the first plunger position detecting device 41 detects the aforementioned stale of the piston rod and provides a starting signal A1 of parison extrusion molding to the parison control circuit 40.

When the parison control circuit 40 receives the signal A1 from the detecting device 41, the parison control circuit 40 provides a chief resin supplying signal B to the solenoid 36a of the first pressure servo valve 36. The first pressure servo valve 36 is connected with the first extrusion cylindrical member 15 by changing from portion 362 to portion 361 of the magnetized solenoid 36a. Therefore, the first plunger 14 is lowered by the lowering operation of the first extrusion cylindrical member 15, so the ringed piston 3 is lowered by the lowering operation of the first plunger 14. Thus, the chief resin material within the resin storing space 5 is forcibly fed towards the annular resin passage 12. At this moment, since the aforementioned resin passage 12 is divided by the ringed member 17 into the inner annular passage 12a and the outer annular passage 12b, the chief resin material passing through the resin passage 12 is caused to be divided into an inner layer and an outer layer by the ringed member 17, at this time, the first plunger position detecting device 41 detects the operation position of the first plunger 14, by way of the first extrusion cylindrical member 15. Therefore, the first plunger position detecting device 41 provides the operation position signal E of the first plunger 14 to the regular values memory circuit 47A. When the memory circuit 47A receives the signal E, the memory circuit 47A memorizing the regular values of mutual relation between the operation position of the first plunger 14 and the chief resin material pressure, provides the regular signal H' of the chief resin material pressure corresponding to the signal E to the comparator 47B, simultaneously the first pressure detecting device 44 detecting the pressure of the chief resin material in the resin passage 12, provides the pressure signal H to the comparator 47B. Therefore, the comparator compares the signal H' with the signal H.

So, when a single-layer parison portion having the chief resin material is a predetermined length by the first plunger 14 being lowered a predetermined portion, the first plunger position detecting device 41 provides a starting signal A2 of multi-layer parison extrusion molding to the parison control circuit 40. When the control circuit 40 receives the signal A2, the control circuit 40 provides an adhesive resin supplying signal C to the third solenoid 38a of the third pressure servo valve 38. Therefore, the third pressure servo valve 38 connecting the hydraulic supply and control equipment 39 with the third extrusion cylindrical member 35 is changed from the portion 382 to the portion 381 by the magnetized solenoid 38a. Accordingly, the third plunger 34 is lowered by the lowering operation of the third extrusion cylindrical member 35. The adhesive resin within the third accumulator 31 is forcibly fed towards the junction of the resin material conduits 21a and 21b, the annular slits 23a and 23b, and the nozzles 25a and 25b. At this moment, the third plunger portion detecting device 43 detects the operation position of the third plunger 34, by way of the third extrusion cylindrical member 35.

Therefore, the third plunger position detecting device 43 provides an operation position signal F of the third plunger to the memory circuit 47A. When the memory circuit 47A receives the signal F, the memory circuit 47A memorizing the regular values of mutual relation between the operation position of the third plunger 34 and the adhesive resin material pressure, provides the regular signal I' of the adhesive resin material pressure corresponding to the signal F to the comparator 47B, simultaneously the third pressure detecting device 46 detecting the pressure of the adhesive resin material in the adhesive resin conduit 29, provides the pressure signal I to the comparator 47B. Therefore, the comparator compares the signal I' with the signal I.

Thereafter, the control circuit 40 provides a barrier resin supplying signal D to the second solenoid 37a of the second pressure servo valve 37.

The second plunger 28 is lowered by the lowering operation of the second extrusion cylindrical member 32, therefore, the barrier resin material within the second accumulator 33 is forcibly fed towards the resin junction, by way of the barrier resin material conduit 20, the annular slit 22 and the nozzle 24. At this moment, the second plunger position detecting device 42 detects the operation position of the second plunger 28, by way of the second extrusion cylindrical member 32. Therefore, the second plunger position detecting device 42 provides the operation position signal G of the second plunger 28 to the memory circuit 47A. When the memory circuit 47A receives the signal G, the memory circuit 47A memorizing the regular values of the mutual relation of the operation position of the second plunger 28 and the barrier resin material pressure, provides the regular signal J' of the barrier resin material pressure corresponding to the signal G to the comparator 47B. Simultaneously, the second pressure detecting device 45 detecting the pressure of the barrier resin material within the barrier resin conduit 26, provides the pressure signal J to the comparator 47B. Therefore, the comparator compares the signal J' with the signal J.

As a result, the multi-layer parison having the construction of the three kinds of the five layered resin materials is extruded, following the single-layer parison.

In case, the respective signals H, I and J where compared with the respective signals H', I' and J' are within the limits of the signals H', I' and J', the comparator 47B does not provide any correction signals, but provides the signals H, I and J to the parison control circuit 40. Therefore, the parison control circuit 40 continues to provide the magnetizing signals to the first, second and third solenoids 36a, 37a and 38a.

Therefore, the respective first, second and third pressure servo valves 36, 37 and 38 continue to position the respective connecting portions of 361, 371 and 381 to the respective first, second and third extruders 15, 32 and 35.

If at least one of the respective signals H, I and J when compared with the respective signals H', I' and J' is beyond the limits of the signals H', I' and J', the comparator 47B provides a correction signal to the parison control circuit 40. For example, in case at least one of the operation positions of the first, second and third plungers 14, 28 and 34 is different from respective predetermined operation positions of the plungers 14, 28 and 34. In another case, the resin material pressures within the resin passage 12 and the resin conduits 26 and 29 are beyond the limits of the respective predetermined resin material pressures in the resin passage due to the resin conduits 26 and 29 due to the chocking of the resin materials, or changed temperatures of the resin materials within the passage 12 and the conduits 26 and 29. The control circuit 40 provides the magnetizing signals to the first, second and third solenoids 36a, 37a and 38a. Therefore, the respective connecting portions of the first, second and third pressure servo valves are changed. The respective resin material pressures are controlled by the controlled positions of the plungers 14, 28 and 34. As a result, the values of the respective resin material pressures are equal to the regular values of the predetermined pressures. Simultaneously, the aforementioned warning device 48 warns the operator of any malfunction.

In the above, the respective extrusion amounts of the resin materials are controlled by the signals of the first, second and third plunger position detecting devices 41, 42 and 43 and the signals of the first second and third pressure detecting devices 44, 45 and 46. If an abnormal state occurs, the respective resin materials are always extruded stably in predetermined amounts by using the control circuit 40 and the correction circuit 47. Therefore, the multi-layer parison including the barrier resin material and the adhesive resin material, although being invisible from the parison outside, are formed as layers of predetermined thicknesses.

Thereafter, the multi-layer parison is extruded a predetermined length by the first plunger 14 being further lowered to a predetermined position. The first plunger position detecting device 41 provides a multi-layer parison forming completion signals A3 to the control circuit 40. When the control circuit 40 receives the signal A3, the control circuit 40 stops sending a barrier resin supplying signal D to the second solenoids 37a. Therefore, the position of the second pressure servo valve 37 is changed from the portion 371 to the portion 372 by the second solenoid 37a being demagnetized.

So, extrusion of the barrier resin into the second accumulator 33 is stopped by the operation of the second extrusion cylindrical member 32 being stopped. Thereafter, a little later, the control circuit 40 stops sending a adhesive resin supplying signal C to the third solenoid 38a. Therefore, the position of the third pressure servo valve 38 is changed from the portion 381 to the portion 382 by the third solenoid 38a being demagnetized. So extrusion of the adhesive resin into the third accumulator 31 is stopped by the operation of the third extrusion cylindrical member 35 being stopped.

After the barrier resin extrusion and the adhesive resin extrusion are stopped, the forming parison changes from the multi-layer parison to the single-layer parison comprising chief resin material.

The single-layer parison is formed for a predetermined length by the first plunger 14 being further lowered to a predetermined position. The first plunger position detecting device 41 provides a parison forming signal A4 to the control circuit 40. When the control circuit 40 receives the signal A4, the control circuit 40 stops sending the chief resin supplying signal B to the first solenoid 36a. Therefore, the position of the first pressure servo valve 36 is changed from the portion 1 to the portion 361 to 362 by the first solenoid 36a being demagnetized.

So, the chief resin extrusion from the resin storing space 5 is stopped by the operation of the first extrusion cylindrical member 15 being stopped.

Therefore, the parison including single-layer upper and lower parison portions and a multi-layer middle parison portion is formed by the above described control of the equipment.

Thereafter, the parison being held by a blow molding form 50A and 50B, is molded to a predetermined form by gas being entered into the parison in a conventional way. It is to be noted here that the present invention is not limited by the above described embodiment, but includes various modifications.

Figure 5:
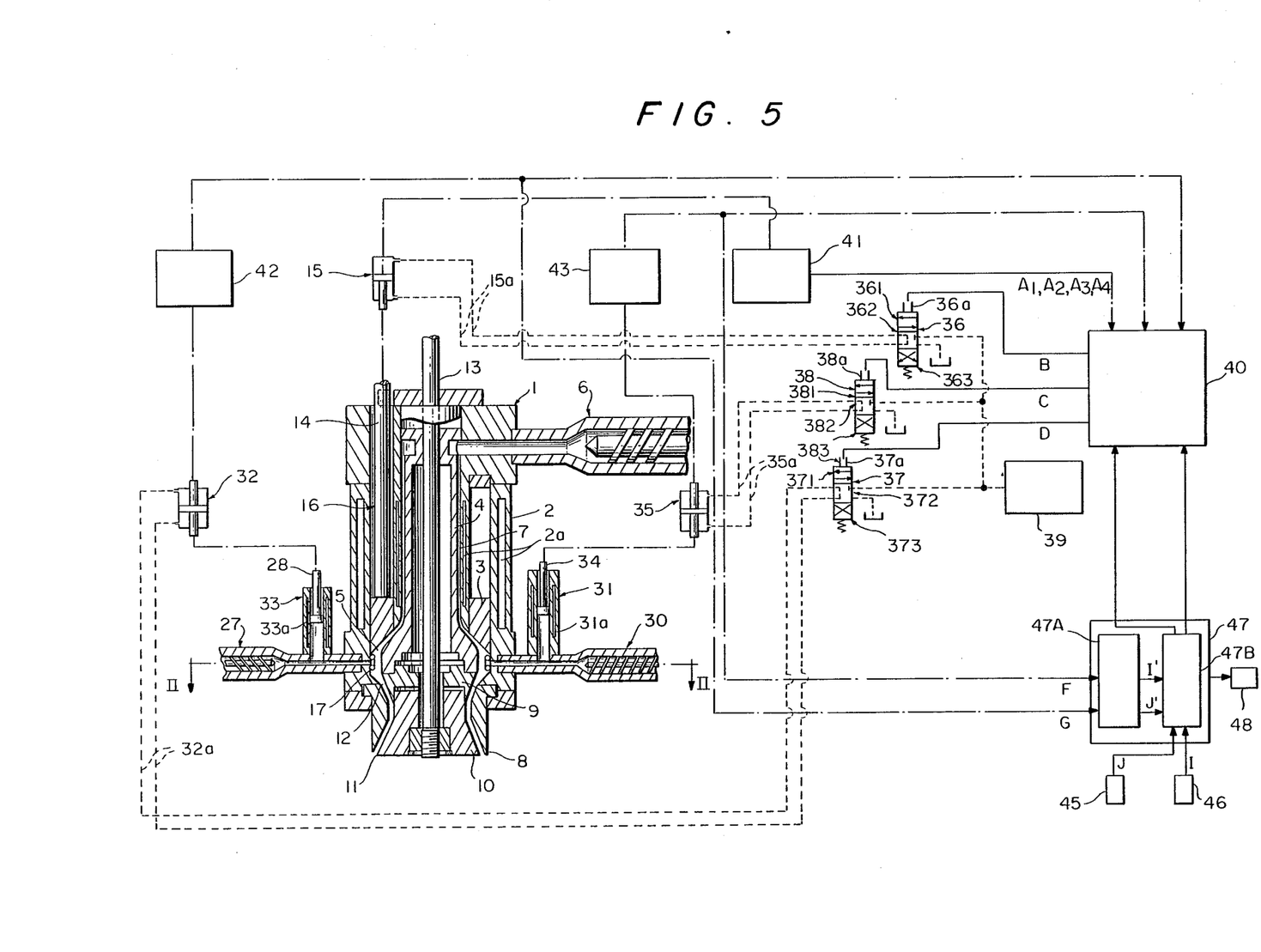
FIG. 5 is a view similar to FIG. 1, showing a modification thereof.

FIG. 5 illustrates one of the modifications of the present invention. As shown, the equipment has a correction system for only the barrier resin extrusion amount and the adhesive resin extrusion amount. No correction is made for the chief resin extrusion amount. Because, the chief resin layer of parison is the outer layer of the multi-layer parison, the operation can check the chief resin layer visually.

In either of the above described embodiments, the barrier resin layer is formed between inner and outer layers of the chief resin material on the assumption that a molded product is desired, like a fuel tank, so gasoline or the like within the tank cannot permeate through the tankwall.

The invention is also applicable to making molded products other than the aforementioned one. For example, the control resin layer may have the function of increasing the molded products strength.

Moreover, although the above described embodiments adapted to correction system of the resin materials extrusion molding to the extrusion molding equipment for a multi-layer parison having the construction of three kinds of fine layered resin materials, the correction system of the present invention can be adapted to extrusion molding equipment for a multi-layer parison having the construction of three kinds of three layered resin materials or the like.

Although the present invention has been fully described by way of example with reference to the accompanying drawings, it is to be noted here that various changes and modifications will be apparent to those skilled in the art.

Therefore, unless otherwise such changes and modifications depart from the scope of the present invention, they should be construed as being included therein.

What is claimed is:

1. Extrusion molding equipment for molding a multi-layer parison having an outer resin layer and an inner resin layer, said extrusion molding equipment comprising:

operational position detecting means for detecting an operational position of an accumulator to extrude said inner resin material and providing a position signal;

pressure detecting means for detecting a pressure of said inner resin material in an inner resin conduit and providing a position signal;

extrusion amount control means for controlling an extrusion amount of said inner resin by the use of said position signal detected by said operational position detecting means and said pressure signal detected by said pressure detecting means;

said extrusion amount control means including memory means for converting said position signal to a regular pressure value and for memorizing said regular pressure value representative of pressure of said inner resin material in a normal operational condition, and correction means for producing a corrected pressure signal based on a comparison of said pressure signal and said regular pressure value;

said extrusion amount control means controlling said accumulator according to said corrected pressure signal so that a substantial portion of said inner resin material is maintained to be equal to said regular pressure value.

2. An extrusion molding equipment as claimed in claim 1, wherein said inner resin layer is composed of at least two resin layers of two kinds of resin materials being extruded by respective accumulators; said operational position detecting means senses said respective accumulators; said pressure detecting means senses the pressure in respective resin conduits of said inner resin materials.

3. An extrusion molding equipment as claimed in claim 2, wherein said material extrusion amount control means receives position signals from the respective operational position detecting means and pressure signals from the respective pressure detecting means and provides correction signals, said control means receiving said correction signals and controlling respective operation positions of said accumulators based on respective correction signals.

4. An extrusion molding equipment as claimed in claim 1, wherein said material extrusion amount control means provides said correction signals to said control means when said regular pressure value and said pressure signal deviate by a predetermined amount, and said control means controls said accumulator by receiving said position signal of said operational position of said accumulator, when said extrusion amount control means does not provide said correction signal.

5. An extrusion molding equipment as claimed in claim 1, further comprising an operational position detecting means for detecting an operational position of an accumulator to extrude said outer resin material; and a pressure detecting means for detecting a pressure of said outer resin material.

6. Extrusion molding equipment as claimed in claim 1, wherein said correction means produces the corrected pressure signal only when the difference between said pressure signal and said regular pressure value is greater than a predetermined limit.

7. Extrusion molding equipment as claimed in claim 6, wherein said extrusion amount control means controls said accumulator according to said position signal when the corrected pressure signal is unavailable.

8. Extrusion molding equipment as claimed in claim 1, wherein said memory means memorizes a mutual relation between the position of a plunger of the accumulator and the pressure of the inner resin material.

9. Extrusion molding equipment as claimed in claim 1, further comprising warning means for warning an operator of a malfunction when the corrected pressure signal is provided to the extrusion amount control means.

10. Extrusion molding equipment as claimed in claim 1, wherein said inner resin is extruded at the same pressure as said outer resin.

11. Extrusion molding equipment as claimed in claim 1, wherein initiation and termination of extrusion of the inner resin are controlled by the position of a plunger of the accumulator for the outer resin.

12. Extrusion molding equipment as claimed in claim 8, wherein said memory means is a look-up table of regular pressure values of mutual relation between respective operation positions of plunges for inner and outer resin layers and respective resin material pressures.

13. Extrusion molding equipment as claimed in claim 12, wherein the inner resin material pressure is set to rise after rise of outer resin material pressure and to fall before fall of outer resin material pressure with respect to a stroke of said plunger.

14. Extrusion molding equipment as claimed in claim 11, wherein the initiation of extrusion of the inner resin occurs after said plunger for the outer resin has proceeded a predetermined length.

15. Extrusion molding equipment as claimed in claim 14, wherein the termination of extrusion of the inner resin occurs after the plunger for the outer resin has proceeded a predetermined length from a point of the initiation of inner resin extrusion, and before termination of extrusion of the outer resin.

16. Extrusion molding equipment as claimed in claim 1, wherein said inner resin conduit opens into an outer resin conduit.

* * * * *